United States Patent [19]

King et al.

[11] 4,138,364

[45] Feb. 6, 1979

[54] CATALYST FOR POLYESTERS AND METHOD FOR MAKING THE SAME

[75] Inventors: Henry L. King, Cary; Chester C. Wu, Raleigh, both of N.C.

[73] Assignee: Monsanto Company, St. Louis, Missouri, Decatur, Ala.

[21] Appl. No.: 863,284

[22] Filed: Dec. 22, 1977

[51] Int. Cl.$^2$ .................... B01J 31/12; C08G 63/12; C08G 17/15
[52] U.S. Cl. ................... 252/431 N; 252/430; 260/429 R; 528/283
[58] Field of Search ............... 252/430, 431 H; 260/75 R, 429 R

[56] References Cited

U.S. PATENT DOCUMENTS 3,651,018  3/1972  Schade et al. .................. 252/430

FOREIGN PATENT DOCUMENTS 46-42493 12/1971 Japan ................... 252/431 C
51-68696  6/1976 Japan ................... 260/75 R Primary Examiner—Winston A. Douglas
Assistant Examiner—P. E. Konopka
Attorney, Agent, or Firm—Robert L. Broad, Jr.

[57] ABSTRACT

A catalyst suitable for use in the preparation of fiber-forming polyesters and the method of making the same, wherein a tetraalkyl ammonium hydroxide is reacted with germanium dioxide, the reaction product being useful as a catalyst in the formation of fiber-forming polyesters.

16 Claims, No Drawings

CATALYST FOR POLYESTERS AND METHOD FOR MAKING THE SAME

BACKGROUND OF THE INVENTION a. Field of the Invention

This invention relates to catalysts suitable for use in preparing fiber-forming polyesters and the method for making the same.

b. Prior Art

It is known to use germanium dixoide as a catalyst in a polycondensation reaction to produce polyesters. The germanium dioxide is sometimes added to the reaction mixture with a glycol, such as ethylene glycol. Unfortunately, the crystalline germanium dioxide has a very low solubility in the glycol, resulting in undissolved catalyst which remains in the polymer. The dissolved catalyst particles may result in undesirable physical characteristics in fibers made from the polymer. Also, low catalyst concentrations cause longer reaction times. Various approaches have been used to overcome the low solubility of the germanium dioxide in the glycol.

In addition to the difficulties encountered in dissolving germanium dixiode in a glycol, the use of this catalyst tends to result in poor color in fibers formed from a polymer made by using this catalyst. Also, germanium dioxide, when used as a catalyst in the formation of polyesters, tends to promote side reactions which form unwanted side products such as diethylene glycol. Other catalysts used in the production of polyesters require longer polymerization times and/or cause the polymer to have an unacceptable color.

SUMMARY OF THE INVENTION

A catalyst suitable for use in the preparation of fiber-forming polyesters and the method of making the same, wherein germanium dioxide is reacted with a tetraalkyl ammonium hydroxide to produce a reaction product which is useful as a catalyst. The reaction may take place in the presence of water or may be carried out in a glycol which is suitable for use in making fiber-forming polyesters. Examples of the tetraalkyl ammonium hydroxide are tetramethyl ammonium hydroxide and tetraethyl ammonium hydroxide.

DETAILED DESCRIPTION OF THE INVENTION

In one embodiment of the process of the present invention, an aqueous solution of a tetraalkyl ammonium hydroxide (TAAH) is added to a glycol containing germanium dioxide to react the germanium dioxide with the TAAH. The solution is then filtered to remove any insoluble material and, optionally, the water added with the TAAH is removed by distillation. The resulting liquid is a clear, colorless solution of germanium dioxide/TAAH in ethylene glycol which may be used as a polymerization catalyst in the preparation of polyesters. The $GeO_2$/TAAH reaction product is an excellent catalyst for the polymerization of fiber-forming polyesters. Faster reactions are obtained, side reactions are reduced and good fiber whiteness is obtained.

It has been found that germanium dioxide and the TAAH react in a molar ratio of one to one. One mole of TAAH is required to cause one mole of $GeO_2$ to dissolve. If it is desired, however, an excess of TAAH may be used. The preferred tetraalkyl ammonium hydroxides are tetraethyl ammonium hydroxide and tetramethyl ammonium hydroxide.

Preferably, the catalyst of this invention is prepared by adding germanium dioxide and the TAAH in a molar ratio of 1:1 to a glycol which is suitable for use in preparing fiber-forming polyesters. The preferred glycol is ethylene glycol (EG). Examples of other glycols, which can be used are propane diol, butane diol, pentane diol and hexane diol.

The amount of $GeO_2$ and TAAH added to the glycol should be such that the catalyst solution contains about 1-25% by weight of $GeO_2$. However, larger or smaller amounts of TAAH and $GeO_2$ may be added to the glycol. The preferred range is 5-15 weight percent.

It is not necessary that the $GeO_2$ and TAAH be reacted in glycol. Commercially available TAAH is usually obtained as an aqueous solution. The $GeO_2$ may, in another embodiment of the invention, simply be added to this aqueous solution without the use of a glycol. Since commercially available TAAH is commonly in the form of an aqueous solution, the reaction will usually be carried out in the presence of water, regardless of whether a glycol is used.

The catalyst of this invention performs well as a catalyst in making polyesters by the process where ethylene glycol is reacted with terephthalic acid and the process where ethylene glycol is reacted with dimethyl terephthalate, as well as in other processes where dibasic acids and alcohols are used to make fiber-forming polyesters.

EXAMPLE I

Germanium dioxide (1.05 grams—0.01 mole) in crystalline form and 3.7 grams (0.01 mole) of 40% aqueous tetraethyl ammonium hydroxide (TEAH) were stirred with 8 grams of EG. The solid $GeO_2$ dissolved almost immediately and the solution was then filtered to remove any insoluble material. The solution was heated to remove 2.25 grams of water. The remaining liquid was a clear, colorless solution weighing 10.5 grams and containing 0.01 mole of catalyst.

EXAMPLE II

Germanium dioxide (1.05 grams—0.01 mole) in crystalline form and 1.82 grams (0.01 mole) of solid, hydrated tetramethyl ammonium hydroxide (50% active) were stirred with 3.3 grams of ethylene glycol. The solid $GeO_2$ dissolved almost immediately and the solution was then filtered to remove any insoluble material. The solution was heated to remove water and the remaining liquid weighed 5.25 grams and contained 0.01 mole of catalyst.

EXAMPLE III

Two grams of germanium dioxide in crystalline form were added to ethylene glycol and the ethylene glycol was heated to about 100° C. While the glycol was still hot, a 40% aqueous solution of tetraethyl ammonium hydroxide was added dropwise until solution of the germanium dioxide in the ethylene glycol was complete. The amount of TEAH required was about 0.0098 moles. The solution was filtered to remove any insoluble material and then the water added with the TEAH was distilled off. The remaining liquid was a clear, colorless solution weighing 30.2 grams and containing the germanium dioxide equivalent of 0.066 grams/milliliter of solution.

EXAMPLE IV

This example was run to illustrate the fact that the catalyst of the present invention may be prepared without the use of a glycol. $GeO_2$ in crystalline form was added to a 40% aqueous solution of tetraethyl ammonium hydroxide at room temperature. The $GeO_2$ immediately went into solution. Thus, the $GeO_2$ and TAAH may be combined in the presence of water simply by adding crystalline $GeO_2$ to a commercially available aqueous solution of TAAH.

While the examples show the removal of water from the catalyst prior to adding it to a reaction vessel, it is not necessary to do so. Any water left with the catalyst will be distilled off during the polycondensation reaction.

If desired, the glycol, containing $GeO_2$, may be heated prior to adding the TAAH. However, this is not necessary, since the $GeO_2$ readily goes into solution at room temperature.

EXAMPLE V

The purpose of this example is to show the use of the catalyst prepared in accordance with Example III.

A slurry of ethylene glycol and terephthalic acid in a molar ratio of 2/1 was reacted at 270° C. at 20 pounds pressure in a continuous polyester esterifier. Water of reaction and some ethylene glycol were removed by distillation and the low molecular prepolymer product collected continuously through a valve at the bottom of the reactor. The rate of removal of prepolymer was such as to maintain a constant level in the reactor and the average residence time in the reactor was 135 minutes. The low molecular weight prepolymer collected had an intrinsic viscosity of 0.08 and a carboxyl concentration of 659 microequivalents per gram.

Two hundred grams of the prepolymer were added to a 1 liter stirred, batch autoclave, purged with nitrogen and heated to 230° C. Pre-melted bis(carboxyethyl) methyl phosphine oxide having a weight of 10.5 grams and the structure

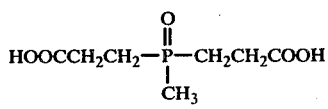

was added to the prepolymer through an addition port atop the autoclave. The autoclave was raised to a temperature of 275–280° C. over a period of 45–60 minutes and 0.5 ml of the catalyst of Example III was added. Pressure in the autoclave was reduced by applying a vacuum and polymerization to form a high molecular weight random copolymer continued at temperatures of 275–280° C. and pressures of less than 2 mm Hg until a polymer having the desired molecular weight was obtained. A polymer with an intrinsic viscosity of 0.54 was obtained in a period of 50 minutes from the beginning of pressure reduction.

The polymer was extruded through a 10-hole spinnerette, the filaments being quenched in a water bath and collected on a Leesona Model 955 take-up machine. The filaments were drawn 6.2 times over a hot pin at 80° C. to yield a 33 denier bundle containing 10 filaments. The drawn filaments had excellent whiteness with a purity value of 2.5 and a brightness of 90.6, as determined from tristimulus values obtained with a G.E. recording spectrophotometer. The filaments analyzed 0.71% phosphorous, melted at 245° C., and had a tenacity of 6.56 grams/denier and a modulus of 93 grams/denier at a breaking elongation of 19.1%. The filament bundle was plied with one strand of 50 dpf fiberglass and knitted into a 9 cm tube on a Lawson knitter. The knitted tube had an oxygen index of 22.3. Unmodified poly(ethylene terephthalate) under the same conditions had an oxygen index of only 20.0.

EXAMPLE VI (COMPARATIVE)

This example shows the use of a conventional antimony catalyst to prepare the phosphine oxide-containing copolymer of Example V.

The copolymer of poly(ethylene terephthalate) with bis(carboxyethyl) methyl phosphine oxide was prepared as in Example V except that the catalyst was 0.12 grams of antimony glycoloxide. A 90 minute polymerization time under vacuum was required and the polymer obtained was a metallic grey. From tristimulus values, fibers from the polymer had a purity of 2.9, but a brightness of only 75.2.

EXAMPLES VII-XI (COMPARATIVE)

These examples show the use of other conventional polymerization catalyst to prepare copolymers containing bis (carboxyethyl) methyl phosphine oxide.

A copolymer of poly(ethylene terephthalate) with bis (carboxyethyl) methyl phosphine oxide was prepared as in Example V except that other well known polymerization catalysts were used. These preparations yielded the following results -

| Example | Catalyst | Catalyst wt., g | Polymerization Time, Min. | Intrinsic Viscosity | Purity | Brightness |
|---------|----------|-----------------|---------------------------|---------------------|--------|------------|
| VII | Zinc Acetate | 0.15 | 135 | 0.47 | 6.0 | 86.9 |
| VIII | Arsenic Oxide | 0.10 | 210 | 0.46 | 4.7 | 87.7 |
| IX | Arsenic Glycoloxide | 0.15 | 225 | 0.47 | 4.3 | 88.7 |
| X | Tetrabutyl Titanate | 0.20 | 60 | 0.57 | 27.2 | 54.9 |
| XI | Antimony Glycoloxide plus calcium acetate | 0.05 0.10 | 85 | 0.56 | 10.8 | 71.6 |

The first 3 catalysts (Examples VII, VIII and IX) resulted in extremely long polymerization times and poorer polymer colors than was obtained with the $GeO_2$-TEAH catalyst of this invention. Even with the long polymerization times the desired high molecular weights were not obtained. The last two catalysts resulted in more normal polymerization times, but the polymers were yellow to brown and grey in color.

What is claimed is:

1. The method of preparing a catalyst suitable for the preparation of polyesters, comprising reacting germanium dioxide with a tetraalkyl ammonium hydroxide in the presence of a medium selected from the group consisting of water and a glycol suitable for use in the formation of fiber-forming polyesters, the molar ratio of tetraalkyl ammonium to germanium oxide to be dissolved being at least about 1.

2. The method of claim 1 wherein the tetraalkyl ammonium hydroxide is selected from the group consisting of tetramethyl ammonium hydroxide and tetraethyl ammonium hydroxide.

3. The method of claim 2 wherein the reaction takes place in the presence of water.

4. The method of claim 2 wherein the reaction is carried out in the presence of a glycol suitable for use in the formation of fiber-forming polyesters.

5. The method of claim 4 wherein the glycol is selected from the group consisting of ethylene glycol, propane diol, butane diol, pentane diol and hexane diol.

6. The method of claim 5 wherein the glycol is ethylene glycol.

7. The method of preparing a catalyst suitable for use in preparation of fiber-forming polyesters, comprising
   a. adding germanium dioxide to a glycol suitable for use in preparing fiber-forming polyesters,
   b. adding a sufficient amount of an aqueous solution of a tetralkyl ammonium hydroxide to the glycol to cause the germanium dioxide to go into solution, and
   c. removing the water added with the tetraalkyl ammonium hydroxide by distillation.

8. The method of claim 7 wherein the tetraalkyl ammonium hydroxide is selected from the group consisting of tetramethyl ammonium hydroxide and tetraethyl ammonium hydroxide.

9. The method of claim 8 wherein the glycol is selected from the group consisting of ethylene glycol, butane diol and hexane diol.

10. The method of claim 9 wherein the glycol contains 1 to 25 weight percent germanium dioxide.

11. A catalyst, comprising the reaction product of germanium dioxide and a tetraalkyl ammoinum hydroxide prepared according to the process of claim 1.

12. The catalyst of claim 11 wherein the tetraalkyl ammonium hydroxide is selected from the group consisting of tetramethyl ammonium hydroxide and tetraethyl ammonium hydroxide.

13. The catalyst of claim 12 wherein said reaction product is present in a glycol suitable for use in the formation of fiber-forming polyesters.

14. The catalyst of claim 13 wherein the glycol is ethylene glycol.

15. The catalyst of claim 14 wherein the tetraalkyl ammonium hydroxide is tetramethyl ammonium hydroxide.

16. The catalyst of claim 14 wherein the tetraalkyl ammonium hydroxide is tetraethyl ammonium hydroxide.

* * * * *